(12) United States Patent
Chen

(10) Patent No.: US 12,659,577 B1
(45) Date of Patent: Jun. 16, 2026

(54) MONITORING DEVICE AND MONITORING SYSTEM

(71) Applicant: Xiaokang Chen, Changsha (CN)

(72) Inventor: Xiaokang Chen, Changsha (CN)

( * ) Notice: Subject to any disclaimer, the term of this patent is extended or adjusted under 35 U.S.C. 154(b) by 0 days.

(21) Appl. No.: 19/336,705

(22) Filed: Sep. 23, 2025

(51) Int. Cl.
| | |
|---|---|
| *H04N 23/65* | (2023.01) |
| *B60R 1/29* | (2022.01) |
| *B60R 16/033* | (2006.01) |
| *H04N 7/18* | (2006.01) |
| *H04N 23/51* | (2023.01) |
| *H04N 23/71* | (2023.01) |
| *H04N 23/75* | (2023.01) |

(52) U.S. Cl.
CPC ............. *H04N 23/651* (2023.01); *B60R 1/29* (2022.01); *B60R 16/033* (2013.01); *H04N 7/183* (2013.01); *H04N 23/51* (2023.01); *B60R 2300/106* (2013.01); *B60R 2300/404* (2013.01); *H04N 23/71* (2023.01); *H04N 23/75* (2023.01)

(58) Field of Classification Search
CPC ................................................... H04N 19/105
See application file for complete search history.

(56) References Cited

U.S. PATENT DOCUMENTS

| | | | | |
|---|---|---|---|---|
| 2015/0103224 A1* | 4/2015 | Min | ....................... | H04N 23/63 |
| | | | | 348/333.13 |
| 2021/0356104 A1* | 11/2021 | Thorne | ............... | F21V 21/0965 |
| 2022/0038607 A1* | 2/2022 | Todd | .................... | G03B 11/043 |
| 2023/0056757 A1* | 2/2023 | Borland | ................... | B60R 1/25 |

* cited by examiner

*Primary Examiner* — Jerry T Jean Baptiste
(74) *Attorney, Agent, or Firm* — HOWARD M COHN and Associates, LLC

(57) ABSTRACT

A monitoring device and a monitoring system are provided. The monitoring device includes a camera module, a display module, a first battery, and a second battery. The camera module includes a first housing body, a first communication module, and a camera. The first communication module and the camera are disposed on the first housing body, and the camera is configured to acquire images. The display module includes a second housing body, a second communication module, a first charging module, and a display screen. The second communication module, the first charging module, and the display screen are disposed at the second housing body, the second communication module is configured to wirelessly communicate with the first communication module to acquire the images acquired by the camera, the second communication module is connected to the display screen to enable the display screen to display the images.

19 Claims, 10 Drawing Sheets

21

21

28    25

29

1

10

20

10

MONITORING DEVICE AND MONITORING SYSTEM

TECHNICAL FIELD

The present disclosure relates to a technical field of electronic devices, and in particular to a monitoring device and a monitoring system.

BACKGROUND

Monitoring devices have gained increasingly widespread application and have gradually become essential components in daily life of human beings, being profoundly embedded in various aspects of everyday activities. Camera modules of monitoring devices are configured to capture image data and transmit captured images to another device, thereby enabling users to access and review the image data for monitoring purposes. Some camera modules are battery-powered to facilitate convenient deployment of cameras. Conventional techniques typically focus on reducing power consumption of the cameras to improve battery endurance. However, current monitoring devices still exhibit insufficient battery life.

SUMMARY

Embodiments of the present disclosure provide a monitoring device and a monitoring system, which significantly improves battery endurance of a camera module in the monitoring device.

In a first aspect, the embodiments of the present disclosure provide a monitoring device, including a camera module, a display module, a first battery, and a second battery. The camera module includes a first housing body, a first communication module, and a camera. The first communication module and the camera are disposed on the first housing body, and the camera is configured to acquire images. The display module includes a second housing body, a second communication module, a first charging module, and a display screen. The second communication module, the first charging module, and the display screen are disposed at the second housing body. The second communication module is configured to wirelessly communicate with the first communication module to acquire the images acquired by the camera. The second communication module is connected to the display screen to enable the display screen to display the images. The first battery and the second battery are alternately detachably disposed at the first housing body and the second housing body. When the first battery is detachably disposed at the first housing body to power the first communication module, the second battery is detachably disposed at the second housing body, and the first charging module is configured to charge the second battery. When the first battery is detachably disposed at the second housing body and the first charging module is configured to charge the first battery, the second battery is detachably disposed at the first housing body to power the camera module.

Furthermore, the display screen is configured to display a power level of at least one of the first battery and the second battery.

Furthermore, the display module further includes a processor, and the processor is connected to the display screen and the second communication module. When the display screen is active, the processor is configured to control the camera module to switch to a working state via the second communication module. When the display screen is inactive, the processor is configured to control the camera module to switch to a sleep state via the second communication module.

Furthermore, the display module further includes a first power supply circuit, the first power supply circuit is connected to an external power source, and the first power supply circuit is configured to power the display module.

Furthermore, the camera module further includes a second power supply circuit, the second power supply circuit is connected to the external power source, and the second power supply circuit is configured to power the camera module.

Furthermore, the camera module further includes a charging circuit, the charging circuit is connected to the external power source, and the charging circuit is configured to power the first battery disposed in the camera module.

Furthermore, the camera module further includes a driving module and an infrared cut (IR-CUT) filter. The driving module is configured to drive the IR-CUT filter to move, so that the IR-CUT filter is disposed in or moves out of an optical path of the camera.

Furthermore, the camera module further includes a sensor, the sensor is configured to detect ambient brightness, the sensor is connected to the driving module and is configured to control the driving module to drive the IR-CUT filter based on the ambient brightness.

Furthermore, a shape of the first battery is the same as a shape of the second battery.

Furthermore, the camera module further includes a base, the base is configured to mount an external component, the first housing body is movably disposed at the base, and the first housing body is rotatable with respect to the base.

Furthermore, the camera module further includes a swivel rod, the swivel rod includes a rod portion and a spherical end portion. The rod portion is connected between the first housing body and the spherical end portion, the base defines a limiting groove, and the spherical end portion is swivelably connected to the limiting groove.

Furthermore, the first housing body defines a first accommodating space and a second accommodating space, the first accommodating space and the second accommodating space are spaced apart, the first communication module is disposed in the first accommodating space, and the first battery is disposed in the second accommodating space. The first housing body further defines a first opening, the first opening is communicated with the second accommodating space, and the first battery is removably mounted in the second accommodating space through the first opening. The camera module further includes a first cover body, and the first cover body is movably disposed at the first housing body to cover or expose the first opening.

Furthermore, the first cover body is detachably disposed at the first housing body. A first end of the first cover body is rotatably connected to the first housing body, and a second end of the first cover body is detachably engaged with the first housing body.

Furthermore, the second housing body defines a third accommodating space and a fourth accommodating space, the third accommodating space and the fourth accommodating space are spaced apart, the second communication module and the first charging module are disposed in the third accommodating space, and the second battery is disposed in the fourth accommodating space. The second housing body further defines a second opening, the second opening is communicated with the fourth accommodating space, and the second battery is removably mounted in the fourth accommodating space through the second opening.

The display module further includes a second cover body, and the second cover body is movably disposed at the second housing body to cover or expose the fourth accommodating space.

Furthermore, the second cover body is detachably disposed at the second housing body. A first end of the second cover body is rotatably connected to the second housing body, and a second end of the second cover body is detachably engaged with the second housing body.

Furthermore, the display module further includes at least one button, the at least one button is configured to control the display module, and the at least one button is disposed at one side of the display screen.

Furthermore, the camera module is configured to detachably mount to a first area, and the display module is configured to detachably mount to a second area.

In a second aspect, the embodiments of the present disclosure further provide the monitoring system, including a vehicle and the monitoring device as foregoing. The monitoring device is mounted to the vehicle.

Furthermore, the vehicle includes a first seat and a second seat, and the first seat and the second seat are arranged along a length direction of the vehicle. The display module and the camera module are mounted at different locations within the vehicle. The camera module is configured to acquire images of the second seat, and the display module is configured for viewing by a user in the first seat.

Furthermore, the display module is connected to the vehicle and obtains electrical power from the vehicle.

According to the monitoring device in the embodiments of the present disclosure, the camera of the camera module is configured to acquire the images. The images acquired by the camera are wirelessly transmitted to the display module via the first communication module of the camera module and the second communication module of the display module. The display screen of the display module is configured to display the images, thereby enabling monitoring. The camera module and the display module are separately arranged, which not only facilitates better image acquisition but also allows the user to conveniently view the images. Meanwhile, the first battery of the camera module is configured to power the camera module, enabling convenient installation of the camera module at desired locations and allowing adjustment of an installation position as needed to acquire images of different areas or from different angles. When the power level of the first battery is insufficient, the second battery of the display module is configured to replace the first battery to power the camera module, thereby improving the battery endurance of the camera module. Furthermore, the first charging module of the display module is configured to charge both the first battery and the second battery, allowing the first battery and the second battery to alternately power the camera module, which further enhances the battery endurance of the camera module.

BRIEF DESCRIPTION OF DRAWINGS

In order to more clearly illustrate technical solutions in embodiments of the present disclosure, accompanying drawings required in description of the embodiments are briefly described below, and obviously, the accompanying drawings in the following description are merely some embodiments of the present disclosure, and for those skilled in the art, other drawings may be obtained according to structures shown in these drawings without creative efforts.

1. monitoring device; 10. camera module; 11. first housing body; 111. first accommodating space; 113. second accommodating space; 115. first opening; 114. driving module; 116. infrared cut (IR-CUT) filter; 118. sensor; 12. first communication module; 13. camera; 14. first battery; 15. second power supply circuit; 16. charging circuit; 17. base; 18. swivel rod; 182. rod portion; 184. spherical end portion; 19. first cover body; 20. display module; 21. second housing body; 211. third accommodating space; 213. fourth accommodating space; 215. second opening; 22. second communication module; 23. first charging module; 24. display screen; 25. second battery; 26. processor; 27. first power supply circuit; 28. second cover body; 29. button; 30. vehicle; 32. first seat; 34. second seat.

DETAILED DESCRIPTION OF EMBODIMENTS

The following clearly and completely describes technical solutions in embodiments of the present disclosure with reference to accompanying drawings in the embodiments of the present disclosure. Obviously, described embodiments are only a part but not all of the embodiments of the present disclosure. The following description of at least one exemplary embodiment is merely illustrative in nature and is in no way intended to limit the present disclosure, corresponding applications, or corresponding uses. All other embodiments obtained by those skilled in the art based on the embodiments of the present disclosure without creative efforts shall fall within a protection scope of the present disclosure.

As used herein, a term "embodiment" means that a particular feature, structure, or characteristic described in connection with an embodiment may be included in at least one embodiment of the present disclosure. Appearance of the term "embodiment" in various locations throughout the specification does not necessarily refer to the same embodiment, nor does it imply that the embodiments of the present disclosure are mutually exclusive, independent, or alternative to one another. Those skilled in the art may readily appreciate, both explicitly and implicitly, that the embodiments described herein may be combined with other embodiments.

Figure 1:
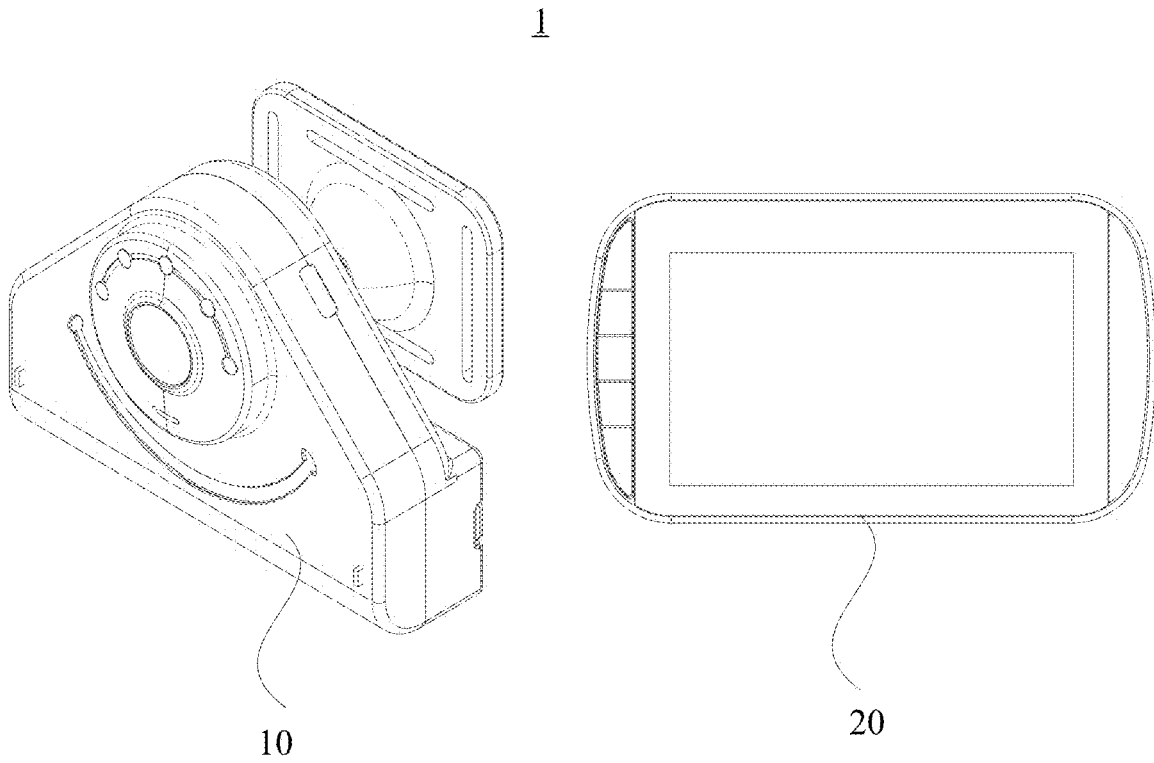
FIG. 1 is a structural schematic diagram of a monitoring device according to one embodiment of the present disclosure.

The embodiments of the present disclosure provide a monitoring device 1, please refer to FIG. 1, FIG. 1 is a structural schematic diagram of a monitoring device 1 according to one embodiment of the present disclosure. The monitoring device 1 includes a camera module 10, a display module 20, a first battery 14, and a second battery 25.

Figure 2:
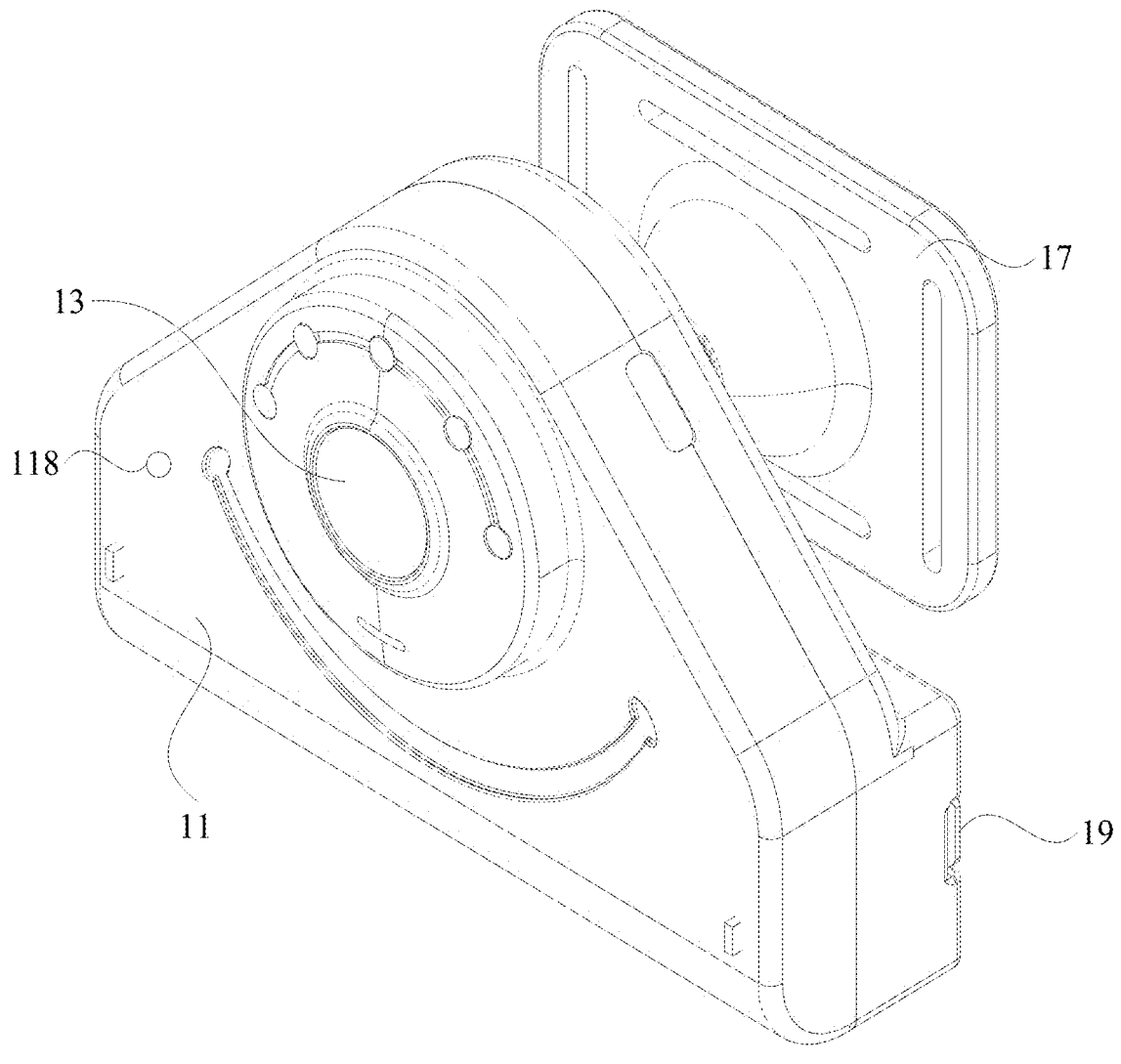
FIG. 2 is a structural schematic diagram of a camera module of the monitoring device shown in FIG. 1.
Figure 3:
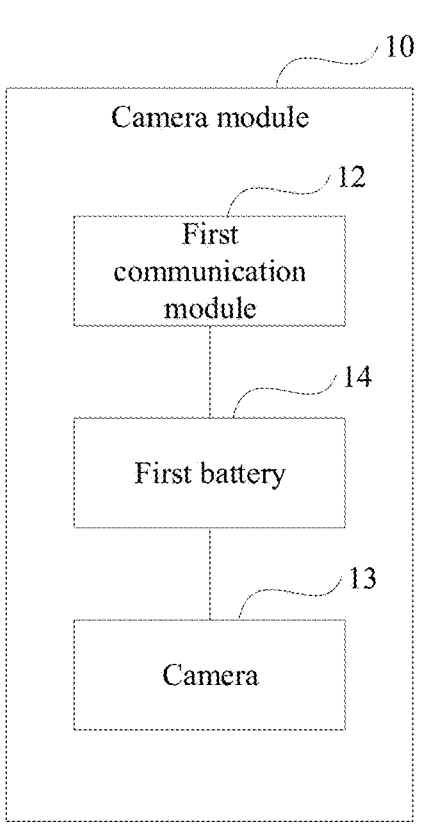
FIG. 3 is a first block diagram of the monitoring device according to one embodiment of the present disclosure.
Figure 3:
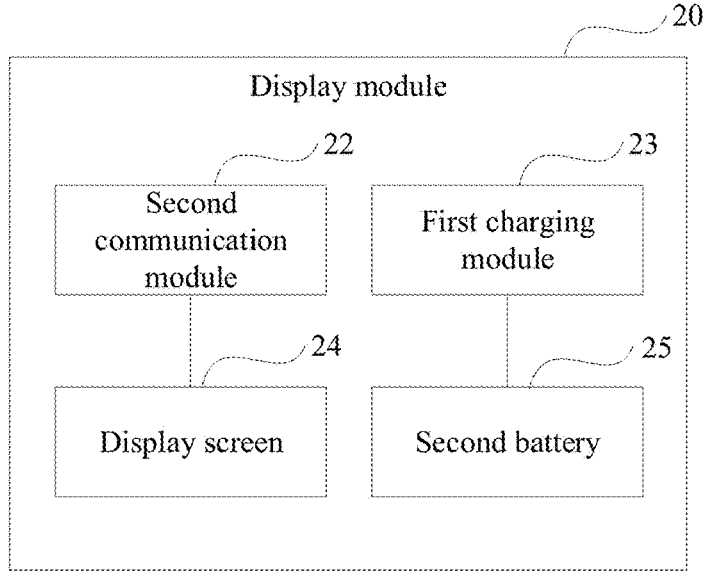

Please refer to FIGS. 2 and 3, FIG. 2 is a structural schematic diagram of a camera module 10 of the monitoring device 1 shown in FIG. 1, and FIG. 3 is a first block diagram of the monitoring device 1 according to one embodiment of the present disclosure. The camera module 10 includes a first housing body 11, a first communication module 12, and a camera 13. The first communication module 12 and the camera 13 are disposed on the first housing body 11, and the camera 13 is configured to acquire images.

Figure 4:
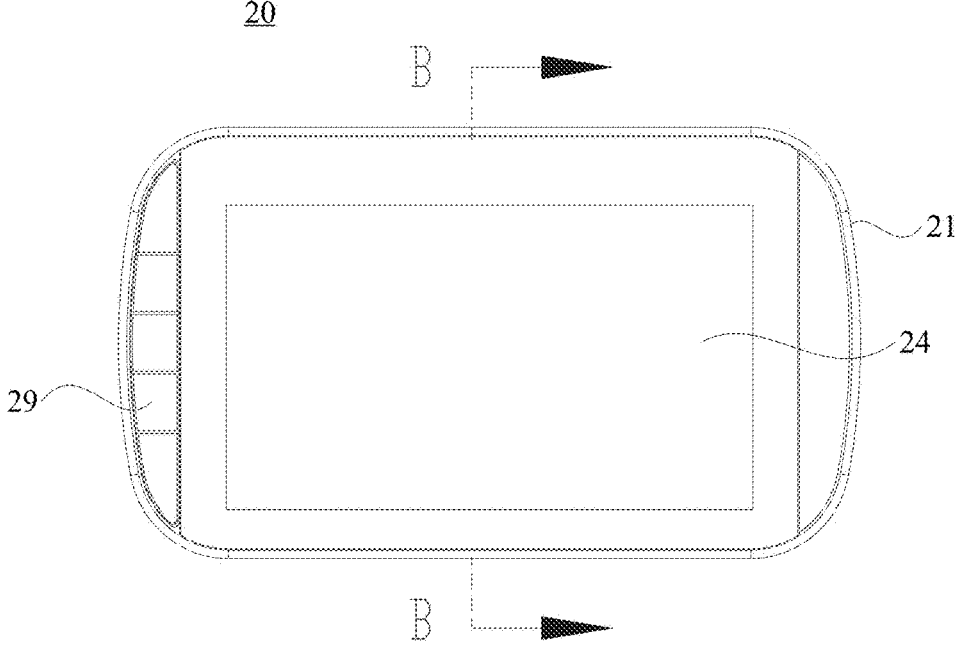
FIG. 4 is a structural schematic diagram of a display module of the monitoring device shown in FIG. 1.

Please refer to FIG. 4, FIG. 4 is a structural schematic diagram of a display module 20 of the monitoring device 1 shown in FIG. 1. The display module 20 includes a second housing body 21, a second communication module 22, a first charging module 23, and a display screen 24. The second communication module 22, the first charging module 23, and the display screen 24 are disposed at the second housing body 21, the second communication module 22 is configured to wirelessly communicate with the first communication module 12 to acquire the images acquired by the camera 13, the second communication module 22 is connected to the display screen 24 to enable the display screen 24 to display the images.

Furthermore, the first battery 14 and the second battery 25 are alternately detachably disposed at the first housing body 11 and the second housing body 21. When the first battery 14 is detachably disposed at the first housing body 11 to power the first communication module 12, the second battery 25 is detachably disposed at the second housing body 21, and the first charging module 23 is configured to charge the second battery 25. When the first battery 14 is detachably disposed at the second housing body 21 and the first charging module 23 is configured to charge the first battery 14, the second battery 25 is detachably disposed at the first housing body 11 to power the camera module 10.

The camera 13 of the camera module 10 is configured to acquire the images. The images acquired by the camera 13 are wirelessly transmitted to the display module 20 via the first communication module 12 of the camera module 10 and the second communication module 22 of the display module 20. The display screen 24 of the display module 20 is configured to display the images, thereby enabling monitoring. The camera module 10 and the display module 20 are separately arranged, which not only facilitates better image acquisition but also allows a user to conveniently view the images. Meanwhile, the first battery 14 of the camera module 10 is configured to power the camera module 10, enabling convenient installation of the camera module 10 at desired locations and allowing adjustment of an installation position as needed to acquire images of different areas or from different angles. When a power level of the first battery 14 is insufficient, the second battery 25 of the display module 20 is configured to replace the first battery 14 to power the camera module 10, thereby improving battery endurance of the camera module 10. Furthermore, the first charging module 23 of the display module 20 is configured to charge both the first battery 14 and the second battery 25, allowing the first battery 14 and the second battery 25 to alternately power the camera module 10, which further enhances the battery endurance of the camera module 10.

It is to be noted that the camera module 10 is powered by the first battery 14 and the second battery 25 that are alternately arranged. Such a configuration does not rely on a single battery and eliminates a need for an excessively large battery, thereby allowing the camera module 10 to be more compact and lightweight.

It is understood that both the first communication module 12 and the second communication module 22 are short-range communication modules, such as a Bluetooth communication module, a Wi-Fi communication module, a ZigBee communication module, or an infrared communication module.

In some embodiments, the camera 13 is a high-definition camera, such as one with 1080P resolution or higher, thereby enabling acquisition of clearer images. It is to be noted that the images acquired by the camera 13 are a video stream or a sequence of continuous images.

In some embodiments, the first communication module 12 and the second communication module 22 establish a 2.4 GHz wireless connection and may further utilize 2.4 GHz Frequency-Hopping Spread Spectrum (FHSS) encryption technology. Thereby, wireless connection between the first communication module 12 and the second communication module 22 is made secure, stable, and resistant to interference, resulting in uninterrupted video streaming. Such design eliminates any wiring concerns, providing the user with a secure and worry-free experience.

Figure 5:
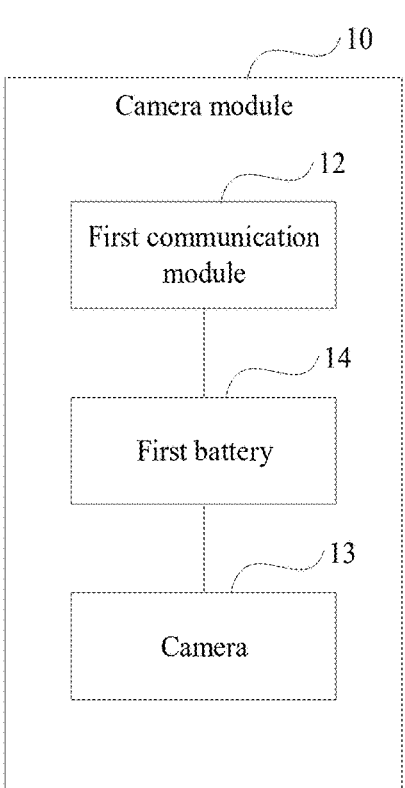
FIG. 5 is a second block diagram of the monitoring device according to one embodiment of the present disclosure.
Figure 5:
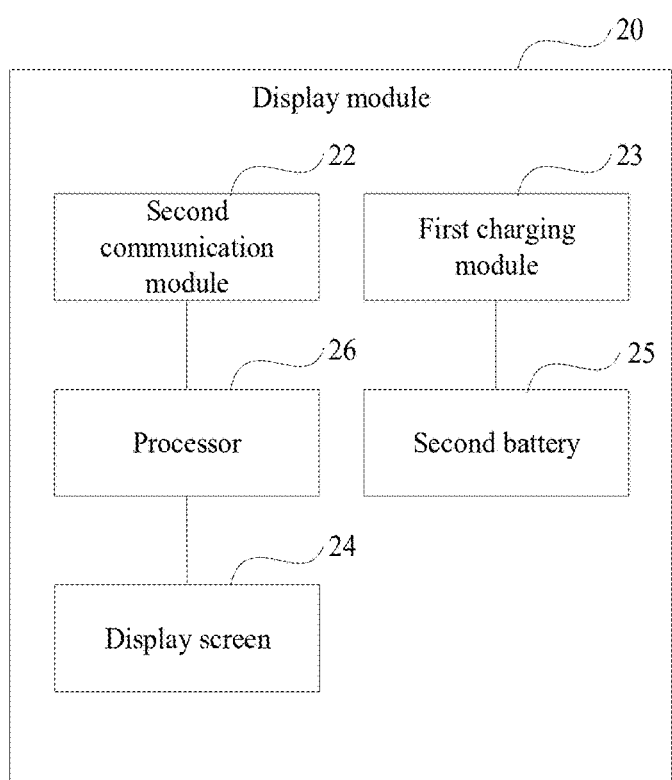

Please refer to FIG. 5, FIG. 5 is a second block diagram of the monitoring device 1 according to one embodiment of the present disclosure. In some embodiments, the display module 20 further includes a processor 26, and the processor 26 is connected to the display screen 24 and the second communication module 22. When the display screen 24 is active, the processor 26 is configured to control the camera module 10 to switch to a working state via the second communication module 22. When the display screen 24 is inactive, the processor 26 is configured to control the camera module 10 to switch to a sleep state via the second communication module 22.

Controlling a status of the camera module 10 via the display screen 24 provides a more intelligent experience and eliminates cumbersome operations. Specifically, when the display screen 24 is activated, the processor 26 of the display module 20 controls the camera module 10, via the second communication module 22, to start up and enter the working state, thereby initiating monitoring. When monitoring is no longer required, the display screen 24 is deactivated. Accordingly, the processor 26 of the display module 20 controls the camera module 10, via the second communication module 22, to enter the sleep state, reducing power consumption of the camera module 10 and improving the battery endurance of the camera module 10.

It is understood that the user performs monitoring in real-time via the display module 20. When the user activates the display screen 24, it indicates an intent to monitor. At this point, the display module 20 controls the camera module 10 to transition from the sleep state to the working state to achieve monitoring purposes. Conversely, when the user deactivates the display screen 24, it indicates that monitoring is no longer needed. The display module 20 then controls the camera module 10 to transition from the working state to the sleep state, thereby reducing the power consumption of the camera module 10.

Specifically, a process of the display module 20 controlling the camera module 10 to transition from the sleep state to the working state is implemented as follows. The processor 26 of the display module 20 is wirelessly communicated with the first communication module 12 via the second communication module 22, and wakes up the camera module 10, thereby causing the camera module 10 to transition from the sleep state to the working state.

Specifically, a process of the display module 20 controlling the camera module 10 to transition from the working state to the sleep state is implemented as follows. The processor 26 of the display module 20 wirelessly communicated with the first communication module 12 via the second communication module 22, and controls the camera module 10 to transition from the working state to the sleep state, namely, to enter an ultra-low-power sleep mode. In some embodiments, a standby time of the camera module 10 in the ultra-low-power sleep mode is as long as 20 months.

Figure 6:
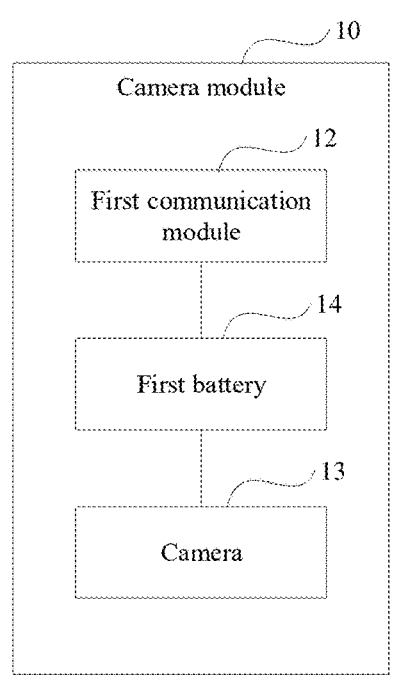
FIG. 6 is a third block diagram of the monitoring device according to one embodiment of the present disclosure.
Figure 6:
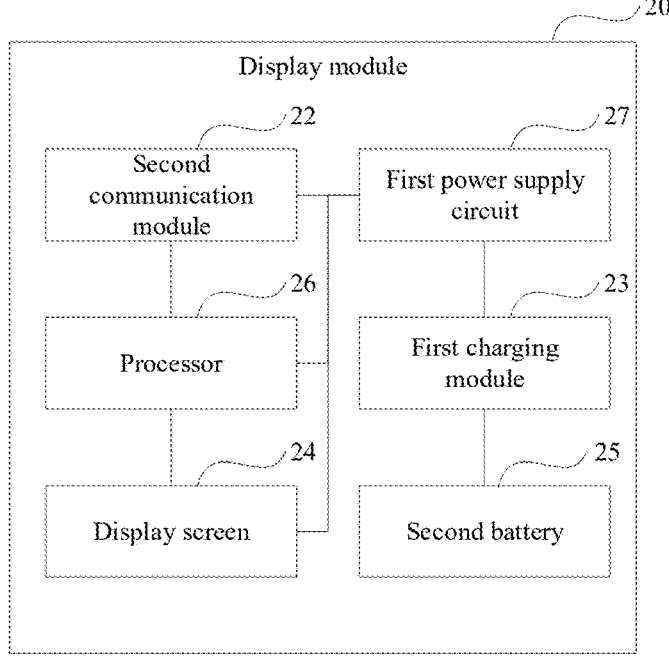

Please refer to FIG. 6, FIG. 6 is a third block diagram of the monitoring device 1 according to one embodiment of the present disclosure. The display module 20 further includes a first power supply circuit 27, the first power supply circuit 27 is connected to an external power source, and the first power supply circuit 27 is configured to power the display module 20.

The first power supply circuit 27 is configured to power the display module 20 in real-time, eliminating a need for battery power and additionally enabling charging of a battery located on the display module 20. The first power supply circuit 27 is connected to the external power source to obtain electrical power. In some embodiments, when the display module 20 is mounted to a vehicle, the external power source that the first power supply circuit 27 is connected to is a vehicle power supply. In some other embodiments, when the display module 20 is mounted indoors, the external power source that the first power supply circuit 27 is connected to is a mains power network. In some other embodiments, the first power supply circuit 27 is also connected to a portable power bank.

Figure 7:
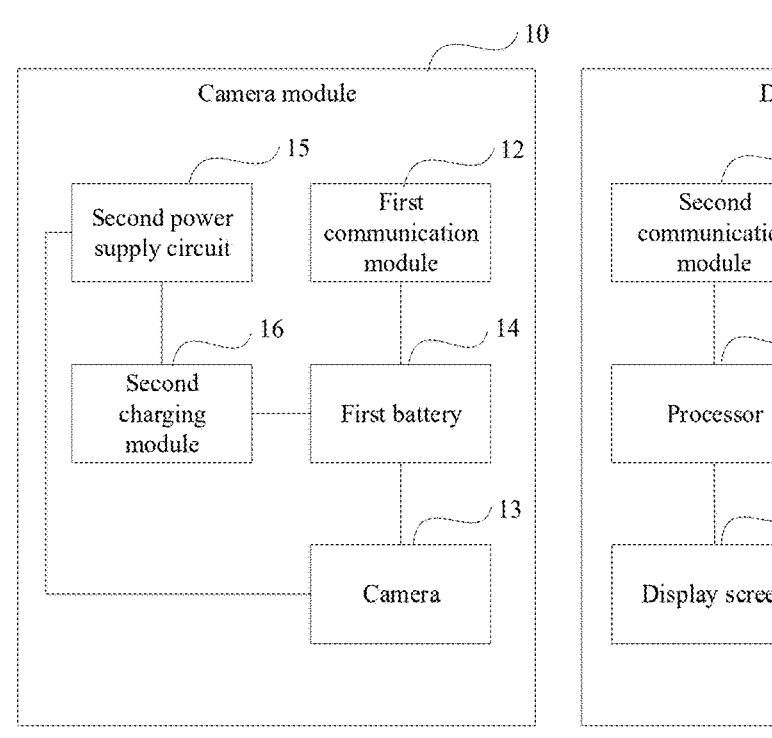
FIG. 7 is a fourth block diagram of the monitoring device according to one embodiment of the present disclosure.

Please refer to FIG. 7, FIG. 7 is a fourth block diagram of the monitoring device 1 according to one embodiment of the present disclosure. The camera module 10 further includes a second power supply circuit 15, the second power supply circuit 15 is connected to the external power source, and the second power supply circuit 15 is configured to power the camera module 10.

The camera module 10 further internally includes the second power supply circuit 15 connected to the external power source. That is, the camera module 10 is powered via the second power supply circuit 15 and the external power source, thereby bypassing the first battery 14. In some embodiments, when the camera module 10 is mounted to the vehicle, the external power source that the second power supply circuit 15 is connected to is the vehicle power supply. In some other embodiments, when the camera module 10 is mounted indoors, the external power source that the second power supply circuit 15 is connected to is the mains power network. In some other embodiments, the second power supply circuit 15 is also connected to the portable power bank.

In some embodiments, the camera module 10 further includes a charging circuit 16, the charging circuit 16 is connected to the external power source, and the charging circuit 16 is configured to power the first battery 14 disposed in the camera module 10.

The camera module 10 further internally includes the charging circuit 16 internally. Under certain circumstances, the first battery 14 disposed in the camera module 10 is charged by the charging circuit 16.

In some embodiments, such as when the charge of both the first battery 14 and the second battery 25 is depleted, or when the second battery 25 is unavailable or missing, the camera module 10 is powered via the second power supply circuit 15. For example, when the camera module 10 is mounted to the vehicle, inserting a USB-A-to-USB-C data cable into a rear-seat outlet of the vehicle may immediately activate the camera module 10. Simultaneously, the camera module 10 is also capable of charging an internal battery thereof, such as the first battery 14, ensuring an adequate power supply even in emergency situations.

It is understood that the second power supply circuit 15 is disposed in the camera module 10, and the charging circuit 16 is not disposed in the camera module 10, or both the second power supply circuit 15 and the charging circuit 16 are simultaneously disposed in the camera module 10.

In some embodiments, a shape of the first battery 14 is the same as a shape of the second battery 25, thereby facilitating interchangeable use therebetween. For example, when a power level of the first battery 14 is insufficient, the first battery 14 is removed from the first housing body 11. Since the second battery 25 has the same shape as the first battery 14, the second battery 25 is capable of conveniently replacing the first battery 14 and being installed into the first housing body 11. Similarly, the first battery 14 is also capable of conveniently replacing the second battery 25 by being installed into the second housing body 21 for powering.

In some embodiments, the first battery 14 and the second battery 25 are identical, further facilitating the interchangeable use therebetween. For example, the first battery 14 and the second battery 25 share identical shape and capacity specifications, enabling seamless replacement therebetween.

In some embodiments, a capacity of the first battery 14 is different from a capacity of the second battery 25. For example, the first battery 14 has a larger capacity and serves as a primary power source for the camera module 10, while the second battery 25 has a smaller capacity and functions as a backup power source for the camera module 10. Such a configuration both meets the endurance requirements of the camera module 10 and helps reduce costs. Specifically, a power supply duration provided by the second battery 25 to the camera module 10 is greater than a charging time required for the first battery 14.

In some embodiments, the display screen 24 is configured to display a power level of at least one of the first battery 14 and the second battery 25. In some examples, the display screen 24 is configured to simultaneously display power levels of both the first battery 14 and the second battery 25, which allows the user to conveniently and concurrently monitor the power levels of both the first battery 14 and the second battery 25, facilitates user judgment on when the first battery 14 or the second battery 25 needs to be replaced, eliminates guesswork, and prevents unexpected power failures. When the power level of the first battery 14 is insufficient and the power level of the second battery 25 is relatively high, the second battery 25 replaces the first battery 14 to power the display module 20, and the first battery 14 is placed into the second housing body 21 for charging. For example, an insufficient power level of the first battery 14 is defined as a remaining charge of the first battery 14 being below a first predetermined threshold relative to a total capacity of the first battery 14. The first predetermined threshold is set according to actual needs, such as to 20%, 15%, or 10%. A relatively high power level of the second battery 25 is defined as a remaining charge of the second battery 25 being above a second predetermined threshold relative to a total capacity of the second battery 25. The second predetermined threshold is set according to actual needs, such as to 80%, 85%, or 90%.

In some embodiments, the display screen 24 is configured to display the power level of the first battery 14, thereby allowing the user to monitor the power level of the first battery 14. When the power level of the first battery 14 is insufficient, the second battery 25 is configured to replace the first battery 14 to power the display module 20.

In some embodiments, the display screen 24 is configured to display the power level of the second battery 25, thereby allowing the user to monitor the power level of the second battery 25. When the power level of the second battery 25 is relatively high, the second battery 25 is configured to replace the first battery 14 to power the display module 20.

Figure 8:
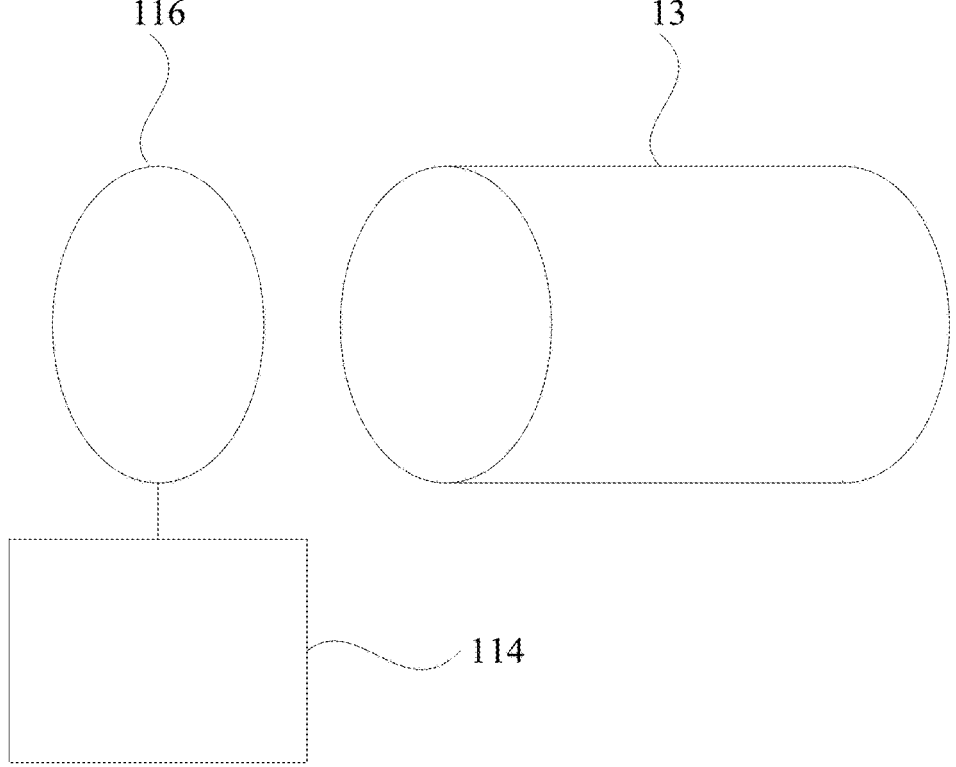
FIG. 8 is a schematic diagram of partial structures of the camera module shown in FIG. 2.

Please refer to FIG. 8, FIG. 8 is a schematic diagram of partial structures of the camera module 10 shown in FIG. 2. The camera module 10 further includes a driving module 114 and an infrared cut (IR-CUT) filter 116. The driving module 114 is configured to drive the IR-CUT filter 116 to move, so that the IR-CUT filter 116 is disposed in or moves out of an optical path of the camera 13.

The camera module 10 mechanically actuates the IR-CUT filter 116, specifically by driving the IR-CUT filter 114 via the driving module 114 to position the IR-CUT filter 116 in or move the IR-CUT filter 116 out of the optical path of the camera 13. Such a configuration achieves true optical-grade night vision performance, delivering superior nighttime clarity while mitigating red glow and blurriness commonly associated with conventional displays. It is understood that when the IR-CUT filter 116 is disposed in the optical path of the camera 13, light entering an optical sensor chip of the camera 13 passes through the IR-CUT filter. Conversely, when the IR-CUT filter 116 is moved out of the optical path of the camera 13, the light entering the optical sensor chip of the camera 13 does not pass through the IR-CUT filter.

In some embodiments, a core function of the IR-CUT filter 116 is selective light filtration. The IR-CUT filter 116 allows visible light, specifically light with wavelengths between 400 nanometers and 650 nanometers that is perceptible to a human eye, such as red, green, and blue, to pass through, while blocking infrared light with wavelengths from 700 nanometers to 1100 nanometers that are invisible to the human eye but detectable by a sensor 118 of the camera 13. An operational logic of the IR-CUT filter 116 is closely related to imaging characteristics of the camera 13. The sensor 118, for example a complementary metal-oxide-semiconductor (CMOS) sensor or a charge-coupled device (CCD) sensor, of the camera 43 has a significantly broader spectral response than human vision, which captures not only visible light but also a substantial amount of infrared light.

When infrared light filtration is required, such as during daytime or in bright light environments, the driving module 114 is configured to drive the IR-CUT filter 116 to move into the optical path of the camera 13. Thereby, the IR-CUT filter 116 filters out infrared light, preventing the infrared light from superimposing with visible light and reaching the sensor 118, so as to prevent imaging issues, such as color distortion, e.g., reddish or yellowish tinting, and loss of contrast, e.g., graying of the images and blurring of details, which could otherwise impair accurate assessment of the user on monitored scenes, for example, hindering clear identification of clothing colors or object characteristics.

When the infrared light filtration is not required, such as at night or in low-light conditions, the driving module 114 is configured to drive the IR-CUT filter 116 to move out of the optical path of the camera 13. In such scenarios, when ambient visible light is insufficient, an infrared supplemental light source, e.g., LED infrared lamps, laser infrared lights, etc., of the camera module 10 is activated. The infrared supplemental light source emits infrared light to illuminate a monitored area. An infrared light reflects off objects and enters the sensor 118 of the camera 13. The sensor 118 then converts infrared light signals into electrical signals, ultimately producing a monochrome night vision image and ensuring clear capture of details in a monitoring scene even under dark conditions.

In some embodiments, please refer to FIG. 2, the camera module 10 further includes the sensor 118, the sensor 118 is configured to detect ambient brightness, the sensor 118 is connected to the driving module 114 and is configured to control the driving module 114 to drive the IR-CUT filter 116 based on the ambient brightness.

The camera module 10 intelligently controls the driving module 114 and the IR-CUT filter 116 via the sensor 118 capable of detecting the ambient brightness. For example, when the sensor 118 detects a low ambient brightness level, the driving module 114 drives the IR-CUT filter 116 to move out of the optical path of the camera 13. Conversely, when the sensor 118 detects a high ambient brightness level, the driving module 114 drives the IR-CUT filter 116 to position the optical path of the camera 13.

Figure 9:
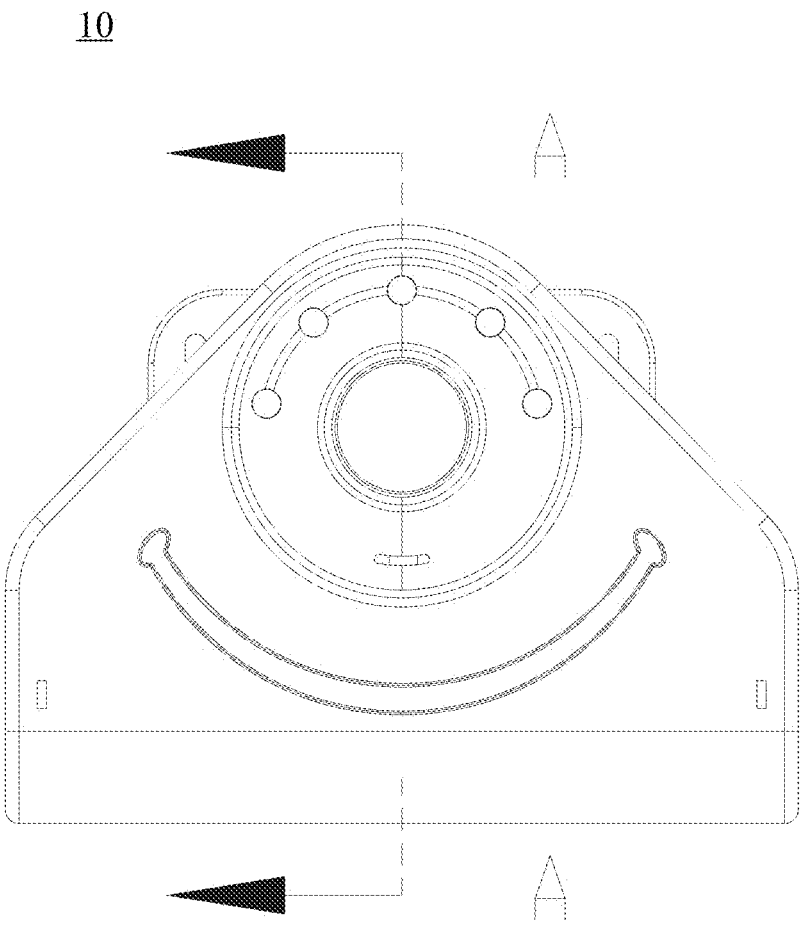
FIG. 9 is another structural schematic diagram of the camera module shown in FIG. 2.
Figure 10:
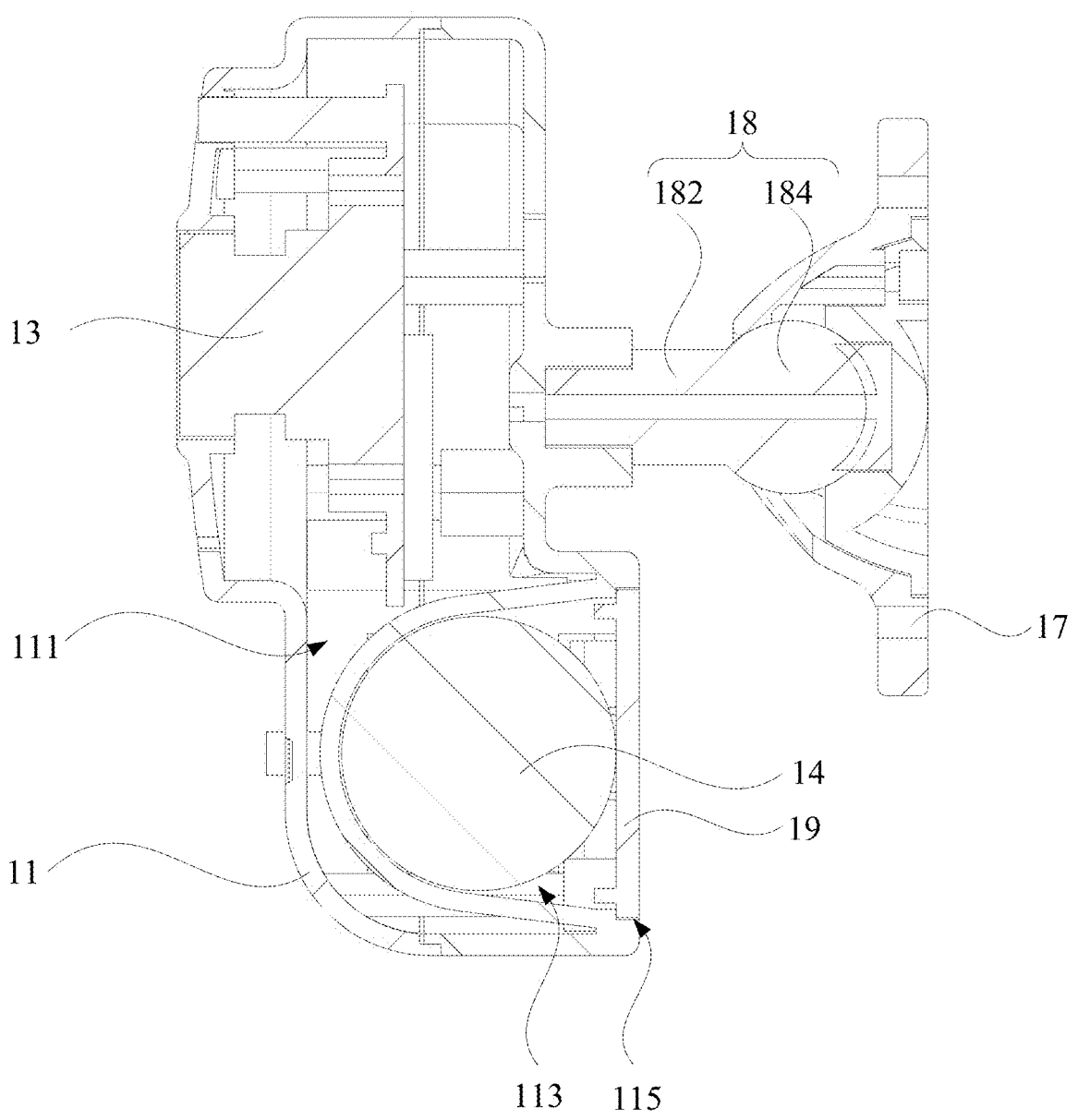
FIG. 10 is a cross-sectional schematic diagram of the camera module taken along the line A-A shown in FIG. 9.

Please refer to FIGS. 9 and 10, FIG. 9 is another structural schematic diagram of the camera module 10 shown in FIG. 2, and FIG. 10 is a cross-sectional schematic diagram of the camera module 10 taken along the line A-A shown in FIG. 9. In some embodiments, the camera module 10 further includes a base 17, the base 17 is configured to mount an external component, the first housing body 11 is movably disposed at the base 17, and the first housing body 11 is rotatable with respect to the base 17. The base 17 is configured to mount the external component, and the first housing body 11 is rotatable with respect to the base 17, which allows for adjustment of an angle of the camera 13 mounted on the first housing body 11, so as to enable selection of a desired shooting angle.

In some embodiments, the base 17 is mounted to the external component via one or more of adhesive bonding, magnetic attachment, snap-fit connection, strapping, etc.

In some embodiments, the camera module 10 further includes a swivel rod 18, the swivel rod 18 includes a rod portion 182 and a spherical end portion 184. The rod portion 182 is connected between the first housing body 11 and the spherical end portion 184, the base 17 defines a limiting groove, and the spherical end portion 184 is swivelably connected to the limiting groove.

Through cooperation of the swivel rod 18 and the limiting groove enables multi-directional adjustment of the camera 13, thereby facilitating optimal selection of desired shooting angles. Compared to fixed-angle adjustment mechanisms, such swivel-based design provides a greater range of motion and better accommodates user requirements.

In some embodiments, the first housing body 11 defines a first accommodating space 111 and a second accommodating space 113, the first accommodating space 111 and the second accommodating space 113 are spaced apart, the first communication module 12 is disposed in the first accommodating space 111, and the first battery 14 is disposed in the second accommodating space 113. The first housing body 11 further defines a first opening 115, the first opening 115 is communicated with the second accommodating space 113, and the first battery 14 is removably mounted in the second accommodating space 113 through the first opening 115. The camera module 10 further includes a first cover body 19, the first cover body 19 is movably disposed at the first housing body 11 to cover or expose the first opening 115.

The first battery 14 is disposed in the second accommodation space 113 that is independently defined. The first cover body 19 is configured to conveniently cover or expose the first opening 115, thereby facilitating installation and removal of the first battery 14. During a process of installing or removing the first battery 14, other modules, such as the first communication module 12, remain unexposed, thereby providing improved protection for these components.

The first cover body 19 is movably mounted to the first housing body 11 by various means.

In some embodiments, the first cover body 19 is detachably disposed at the first housing body 11. The first cover body 19 is capable of completely detaching from the first housing body 11. For example, the first cover body 19 is secured to the first housing body 11 via screws. By removing the screws, the first cover body 19 is fully detached from the first housing body 11. Alternatively, opposite ends of the first cover body 19 are detachably engaged with the first housing body 11 via a snap-fit connection, allowing the first cover body 19 to be snapped onto or detached from the first housing body 11.

In some embodiments, a first end of the first cover body 19 is rotatably connected to the first housing body 11, and a second end of the first cover body 19 is detachably engaged with the first housing body 11. The first cover body 19 is partially detachable from the first housing body 11. For example, the first end of the first cover body 19 is rotatably connected to the first housing body 11, and the second end of the first cover body 19 is detachably engaged with the first housing body 11 via the screws or the snap-fit connection.

In some embodiments, a first sealing gasket is disposed between the first cover body 19 and the first housing body 11 to enhance sealing performance therebetween, thereby providing improved protection for a battery (e.g., the first battery 14) disposed in the first housing body 11.

Figure 11:
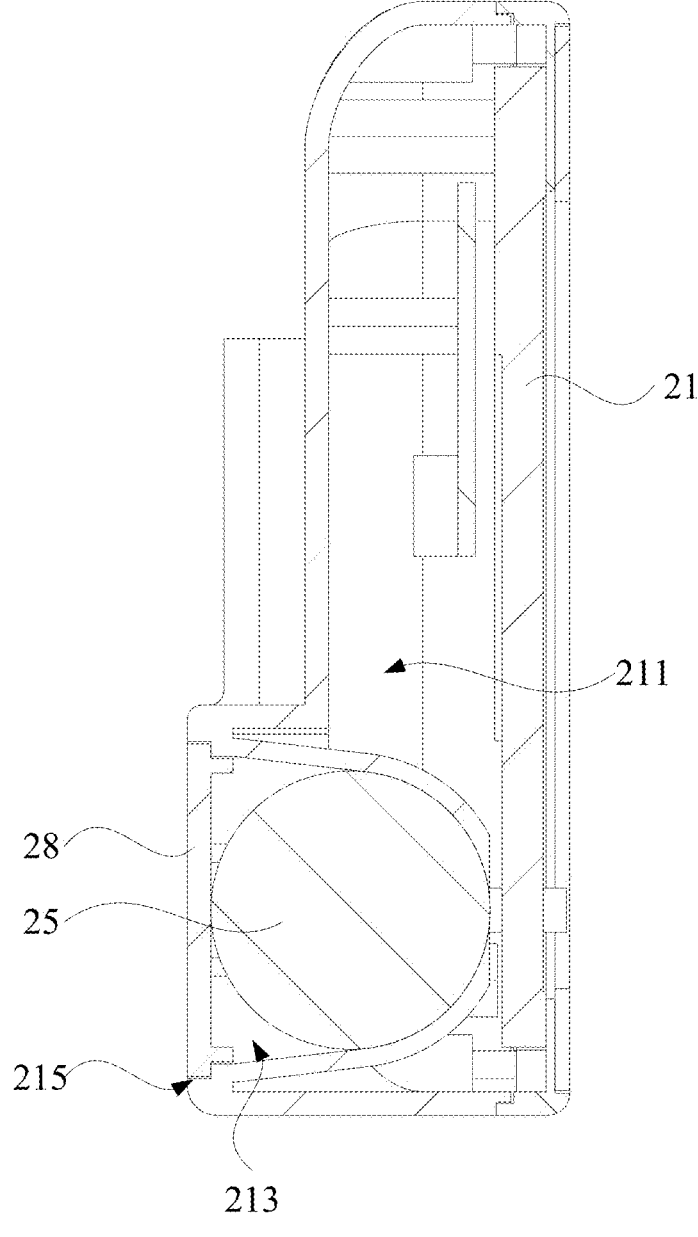
FIG. 11 is a cross-sectional schematic diagram of the display module taken along the line B-B shown in FIG. 4.
Figure 12:
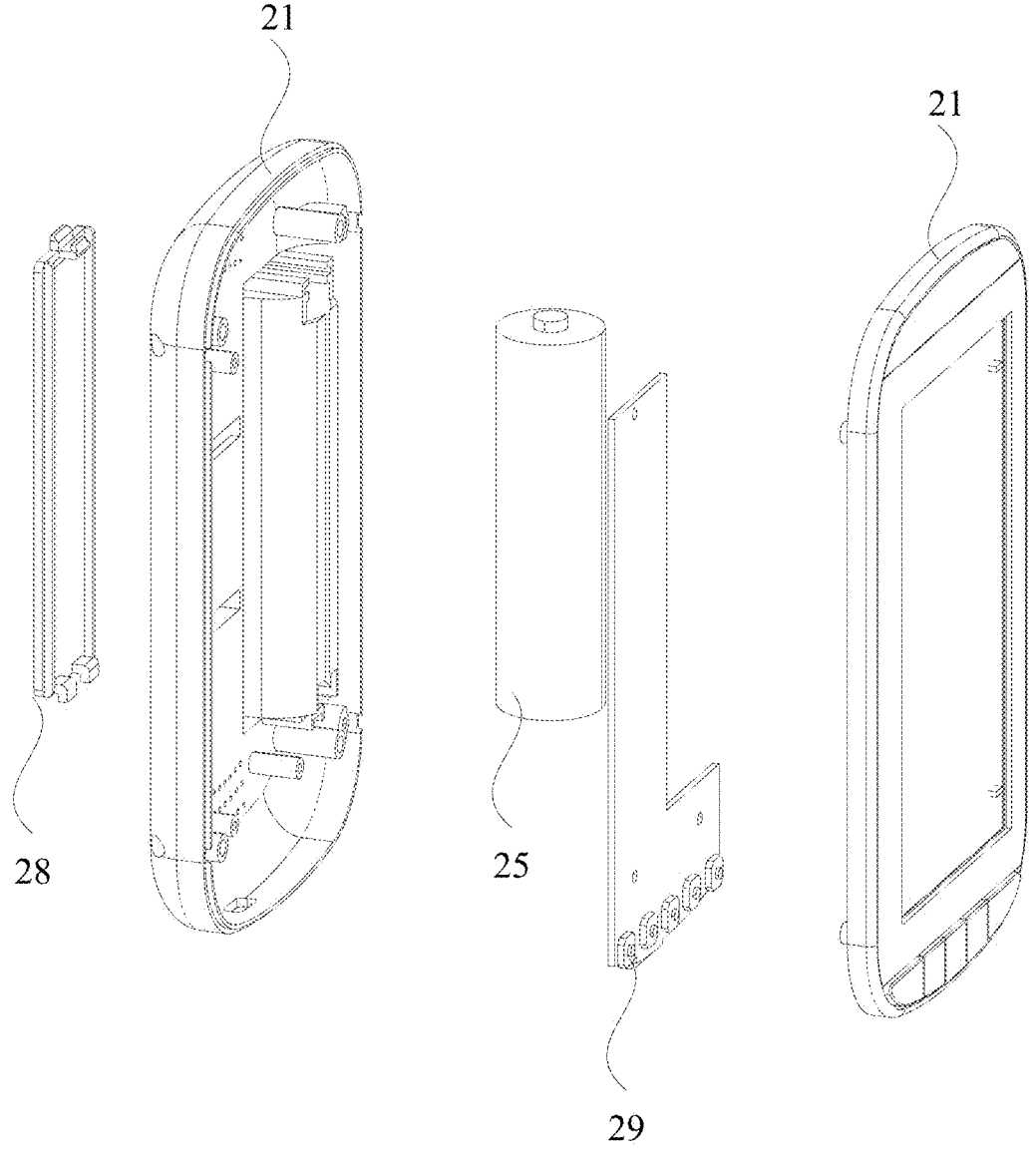
FIG. 12 is an exploded schematic diagram of the display module shown in FIG. 4.

Please refer to FIGS. 11 and 12, FIG. 11 is a cross-sectional schematic diagram of the display module 20 taken along the line B-B shown in FIG. 4, and FIG. 12 is an exploded schematic diagram of the display module 20 shown in FIG. 4. In some embodiments, the second housing body 21 defines a third accommodating space 211 and a fourth accommodating space 213, the third accommodating space 211 and the fourth accommodating space 213 are spaced apart, the second communication module 22 and the first charging module 23 are disposed in the third accommodating space 211, and the second battery 25 is disposed in the fourth accommodating space 213. The second housing body 21 further defines a second opening 215, the second opening 215 is communicated with the fourth accommodating space 213, and the second battery 25 is removably mounted in the fourth accommodating space 213 through the second opening 215. The display module 20 further includes a second cover body 28, the second cover body 28 is movably disposed at the second housing body 21 to cover or expose the fourth accommodating space 213.

The second battery 25 is disposed in the fourth accommodation space 213 that is independently defined. The second cover body 28 is configured to conveniently cover or expose the second opening 215, thereby facilitating installation and removal of the second battery 25. During a process of installing or removing the second battery 25, other modules, such as the second communication module 22 and the first charging module 23, remain unexposed, thereby providing improved protection for these components.

The second cover body 28 is movably mounted to the second housing body 21 by various means.

In some embodiments, the second cover body 28 is detachably disposed at the second housing body 21. The second cover body 28 is capable of completely detaching from the second housing body 21. For example, the second cover body 28 is secured to the second housing body 21 via screws. By removing the screws, the second cover body 28 is fully detached from the second housing body 21. Alternatively, opposite ends of the second cover body 28 are detachably engaged with the second housing body 21 via a snap-fit connection, allowing the second cover body 28 to be snapped onto or detached from the second housing body 21.

In some embodiments, a first end of the second cover body 28 is rotatably connected to the second housing body 21, and a second end of the second cover body 28 is detachably engaged with the second housing body 21. The second cover body 28 is partially detachable from the second housing body 21. For example, the first end of the second cover body 28 is rotatably connected to the second housing body 21, and the second end of the second cover body 28 is detachably engaged with the second housing body 21 via the screws or the snap-fit connection.

In some embodiments, a second sealing gasket is disposed between the second cover body 28 and the second housing body 21 11 to enhance sealing performance therebetween, thereby providing improved protection for a battery (e.g., the second first battery 25) disposed in the second housing body 21.

In some embodiments, the display module 20 further includes at least one button 29, the at least one button 29 is configured to control the display module 20, and the at least one button 29 is disposed at one side of the display screen 24. The at least one button 29 disposed at the one side of the display module 20 allows for convenient control of the display module 20, such as activating or deactivating the display screen 24.

In some embodiments, the display module 20 is capable of audio playback, and the at least one button 29 is configured to adjust a volume level.

In some embodiments, the display screen 24 is a touch screen capable of receiving external operational commands to control the display module 20. For example, a specific area of the display screen 24 is magnified for enlarged viewing based on touch input.

In some embodiments, the display module 20 further includes a circuit board, the circuit board includes a first board body and a second board body. The first board body and the second board body extend along different directions to accommodate and avoid interference with internal components, such as the second battery 25. For example, the first board body extends along a height direction of the display module 20, the second board body extends along a length direction of the display module 20, the first board body and the second board body together form an L-shaped configuration. In one embodiment, the first board body and the second board body are integrally formed, resulting in a custom-shaped circuit board designed to create space for and avoid the battery (e.g., the second battery 25) disposed in the display module 20.

In some embodiments, the camera module 10 is configured to detachably mount to a first area, and the display module 20 is configured to detachably mount to a second area. The camera module 10 and the display module 20 are mounted to different areas according to actual needs, thereby providing greater flexibility in positioning the camera module 10 and the display module 20, so as to allow the user to optimally adjust both a monitoring area and a viewing area.

In some embodiments, the monitoring device 1 and the display module 20 are placed in different rooms. For example, the camera module 10 is placed in a room where a child or infant is sleeping, while the display module 20 is placed in another room where the user is working. Such a configuration allows the user to monitor the child or infant in real-time without disturbing their sleep with work-related activities. Furthermore, the camera module 10 is positioned at any desired location to achieve optimal viewing angles according to user requirements. Similarly, the display module 20 is placed at any convenient location to minimize interference with user activities, such as in a kitchen room, a study room, a living room, or any other room as needed.

Figure 13:
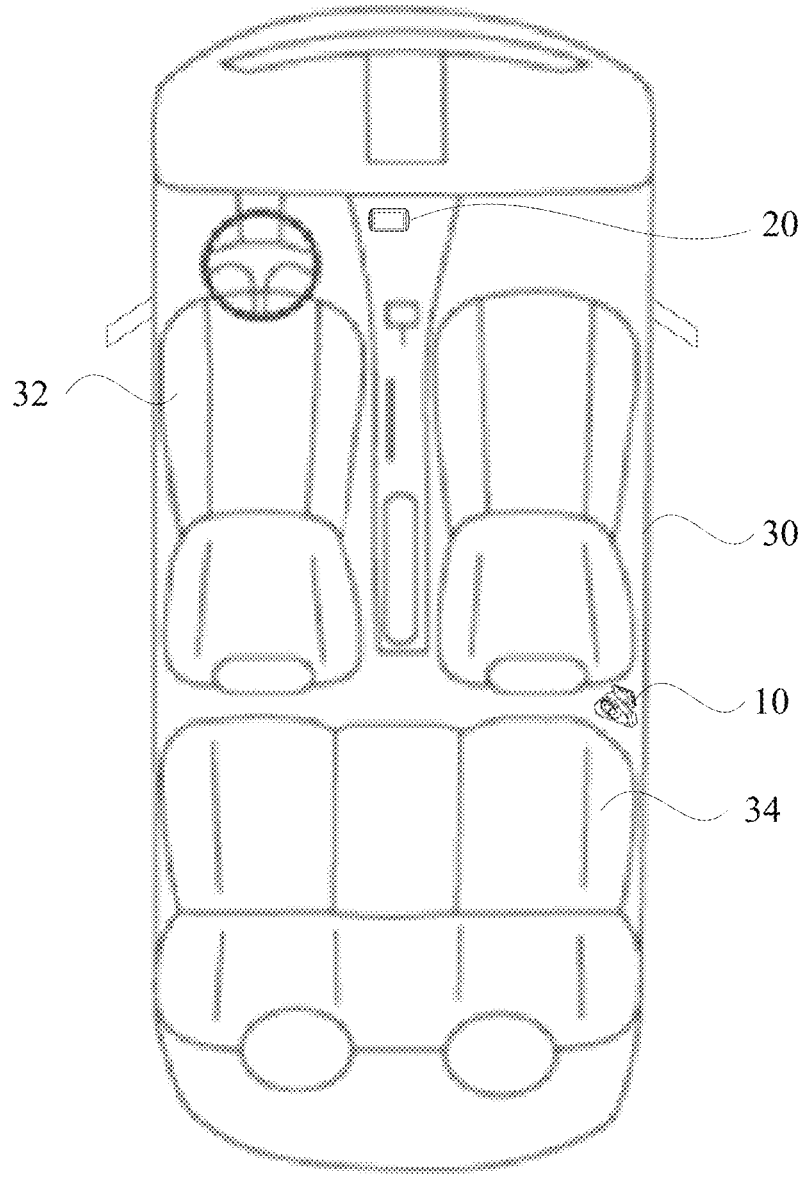
FIG. 13 is a structural schematic diagram of a monitoring system according to one embodiment of the present disclosure.

The embodiments of the present disclosure further provide a monitoring system. Please refer to FIG. 13, FIG. 13 is a structural schematic diagram of a monitoring system according to one embodiment of the present disclosure. The monitoring system includes the vehicle 30 and the monitoring device 1 as foregoing. The monitoring device 1 is mounted to the vehicle 30, and the monitoring device 1 is the monitoring device 1 according to any of the preceding embodiments, which is not repeated herein.

In some embodiments, the vehicle 30 includes a first seat 32 and a second seat 34, and the first seat 32 and the second seat 34 are arranged along a length direction of the vehicle 30. The display module 20 and the camera module 10 are mounted at different locations within the vehicle 30, the camera module 10 is configured to acquire images of the second seat 34, and the display module 20 is configured for viewing by a user in the first seat 32.

For example, the display module 20 is positioned in front of the first seat 32, facilitating viewing by the user in the first seat 32. The camera module 10 is mounted to a backrest of the first seat 32 to acquire the images of the second seat 34, such as images of a child or infant seated in the second seat 34. Such a configuration allows a passenger in the first seat 32 to see the images of the child or infant in the second seat 34 without turning their heads, thereby ensuring both safe driving and continuous monitoring of children or infants in rear seats.

In some embodiments, the display module 20 is connected to the vehicle 30 and obtains electrical power from the vehicle 30. The display module 20 is capable of drawing electrical power from the vehicle 30, thereby ensuring an operation thereof and conveniently charging the battery (e.g., the second battery 25) disposed in the display module 20.

In the foregoing embodiments, description of each embodiment has its own emphasis, and parts that are not described in detail in an embodiment may refer to related descriptions of other embodiments. The embodiments, implementations, and related technical features of the present disclosure may be combined and replaced with each other without conflict.

The monitoring device in the embodiments of the present disclosure is described in detail above, and specific examples are used herein to describe principles and the embodiments of the present disclosure, and description of the above embodiments is only used to help understand a method of the present disclosure and a core idea thereof; meanwhile, for those skilled in the art, according to the idea of the present disclosure, there may be changes in specific embodiments and application ranges. In summary, a content of the present specification should not be construed as limiting the present disclosure.

What is claimed is:

1. A monitoring device, comprising:
 a camera module;
 a display module;
 a first battery; and
 a second battery;
 wherein the camera module comprises a first housing body, a first communication module, and a camera;
 wherein the first communication module and the camera are disposed at the first housing body, and the camera is configured to acquire images;
 wherein the display module comprises a second housing body, a second communication module, a first charging module, and a display screen;
 wherein the second communication module, the first charging module, and the display screen are disposed at the second housing body, the second communication module is configured to wirelessly communicate with the first communication module to acquire the images acquired by the camera, the second communication module is connected to the display screen to enable the display screen to display the images;
 wherein the first battery and the second battery are alternately detachably disposed at the first housing body and the second housing body;
 wherein when the first battery is detachably disposed at the first housing body to power the first communication module, the second battery is detachably disposed at the second housing body, and the first charging module is configured to charge the second battery;
 wherein when the first battery is detachably disposed at the second housing body and the first charging module is configured to charge the first battery, the second battery is detachably disposed at the first housing body to power the camera module;
 wherein the first housing body defines a first accommodating space and a second accommodating space, the second housing body defines a third accommodating space and a fourth accommodating space, the third accommodating space and the fourth accommodating space are spaced apart, the second communication module and the first charging module are disposed in the third accommodating space, and the second battery is disposed in the fourth accommodating space;
 the first housing body further defines a first opening, the second housing body further defines a second opening, the second opening is communicated with the fourth accommodating space, and the second battery is removably mounted in the fourth accommodating space through the second opening; and
 the camera module further comprises a first cover body, the display module further comprises a second cover body, the second cover body is movably disposed at the second housing body to cover or expose the fourth accommodating space.

2. The monitoring device according to claim 1, wherein the display screen is configured to display a power level of at least one of the first battery and the second battery.

3. The monitoring device according to claim 1, wherein the display module further comprises a processor, and the processor is connected to the display screen and the second communication module;

when the display screen is active, the processor is configured to control the camera module to switch to a working state via the second communication module; and when the display screen is inactive, the processor is configured to control the camera module to switch to a sleep state via the second communication module.

4. The monitoring device according to claim 1, wherein the display module further comprises a first power supply circuit, the first power supply circuit is connected to an external power source, and the first power supply circuit is configured to power the display module.

5. The monitoring device according to claim 1, wherein the camera module further comprises a second power supply circuit, the second power supply circuit is connected to an external power source, and the second power supply circuit is configured to power the camera module.

6. The monitoring device according to claim 5, wherein the camera module further comprises a charging circuit, the charging circuit is connected to the external power source, and the charging circuit is configured to power the first battery disposed in the camera module.

7. The monitoring device according to claim 1, wherein the camera module further comprises a driving module and an infrared cut (IR-CUT) filter, the driving module is configured to drive the IR-CUT filter to move, so that the IR-CUT filter is disposed in or moves out of an optical path of the camera.

8. The monitoring device according to claim 7, wherein the camera module further comprises a sensor, the sensor is configured to detect ambient brightness, the sensor is connected to the driving module and is configured to control the driving module to drive the IR-CUT filter based on the ambient brightness.

9. The monitoring device according to claim 1, wherein a shape of the first battery is the same as a shape of the second battery.

10. The monitoring device according to claim 1, wherein the camera module further comprises a base, the base is configured to mount an external component, the first housing body is movably disposed at the base, and the first housing body is rotatable with respect to the base.

11. The monitoring device according to claim 10, wherein the camera module further comprises a swivel rod, the swivel rod comprises a rod portion and a spherical end portion; and the rod portion is connected between the first housing body and the spherical end portion, the base defines a limiting groove, and the spherical end portion is swivelably connected to the limiting groove.

12. The monitoring device according to claim 1, wherein the first accommodating space and the second accommodating space are spaced apart, the first communication module is disposed in the first accommodating space, and the first battery is disposed in the second accommodating space;

the first opening is communicated with the second accommodating space, and the first battery is removably mounted in the second accommodating space through the first opening; and the first cover body is movably disposed at the first housing body to cover or expose the first opening.

13. The monitoring device according to claim 12, wherein the first cover body is detachably disposed at the first housing body; and a first end of the first cover body is rotatably connected to the first housing body, and a second end of the first cover body is detachably engaged with the first housing body.

14. The monitoring device according to claim 1, wherein the second cover body is detachably disposed at the second housing body; and a first end of the second cover body is rotatably connected to the second housing body, and a second end of the second cover body is detachably engaged with the second housing body.

15. The monitoring device according to claim 1, wherein the display module further comprises at least one button, the at least one button is configured to control the display module, and the at least one button is disposed at one side of the display screen.

16. The monitoring device according to claim 1, wherein the camera module is configured to detachably mount to a first area, and the display module is configured to detachably mount to a second area.

17. A monitoring system, comprising:

a vehicle; and the monitoring device according to claim 1;

wherein the monitoring device is mounted to the vehicle.

18. The monitoring system according to claim 17, wherein the vehicle comprises a first seat and a second seat, and the first seat and the second seat are arranged along a length direction of the vehicle; and the display module and the camera module are mounted at different locations within the vehicle, the camera module is configured to acquire images of the second seat, and the display module is configured for viewing by a user in the first seat.

19. The monitoring device according to claim 18, wherein the display module is connected to the vehicle and obtains electrical power from the vehicle.

* * * * *